US008494559B1

(12) United States Patent
Malmi

(10) Patent No.: US 8,494,559 B1
(45) Date of Patent: Jul. 23, 2013

(54) METHOD AND SYSTEM FOR SELECTING A WIRELESS ACCESS TECHNOLOGY USING LOCATION BASED INFORMATION

(75) Inventor: Robert A. Malmi, Red Bank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 944 days.

(21) Appl. No.: 11/322,751

(22) Filed: Dec. 30, 2005

(51) Int. Cl.
*H04W 24/00* (2009.01)

(52) U.S. Cl.
USPC ........ 455/456.3; 455/433; 455/436; 455/437; 455/438; 455/439; 455/440; 455/441; 455/442; 455/443; 455/444

(58) Field of Classification Search
USPC ................ 455/433, 436, 437, 438, 439, 440, 455/441, 442, 443, 444, 456.1, 456.3
See application file for complete search history.

(56) References Cited

U.S. PATENT DOCUMENTS

| | | | |
|---|---|---|---|
| 6,011,973 A | 1/2000 | Valentine et al. | |
| 6,208,857 B1 * | 3/2001 | Agre et al. | 455/428 |
| 6,466,796 B1 * | 10/2002 | Jacobson et al. | 455/456.3 |
| 6,978,023 B2 | 12/2005 | Dacosta | |
| 7,155,238 B2 * | 12/2006 | Katz | 455/456.1 |
| 2001/0039623 A1 * | 11/2001 | Ishikawa | 713/201 |
| 2003/0091030 A1 | 5/2003 | Vegin et al. | |
| 2003/0133421 A1 * | 7/2003 | Sundar et al. | 370/328 |
| 2003/0182095 A1 * | 9/2003 | Saito et al. | 703/14 |
| 2003/0223395 A1 * | 12/2003 | Chitrapu | 370/338 |
| 2004/0023669 A1 * | 2/2004 | Reddy | 455/456.1 |
| 2004/0203732 A1 * | 10/2004 | Brusilovsky et al. | 455/426.1 |
| 2004/0203789 A1 | 10/2004 | Hammond et al. | |
| 2004/0203824 A1 * | 10/2004 | Mock et al. | 455/452.1 |
| 2004/0259546 A1 * | 12/2004 | Balachandran et al. | 455/435.2 |
| 2005/0003818 A1 * | 1/2005 | Kanto et al. | 455/435.2 |
| 2005/0180368 A1 * | 8/2005 | Hansen et al. | 370/338 |
| 2005/0232189 A1 * | 10/2005 | Loushine | 370/328 |
| 2005/0288036 A1 * | 12/2005 | Brewer et al. | 455/456.2 |
| 2006/0121914 A1 * | 6/2006 | Kim et al. | 455/456.1 |
| 2006/0217147 A1 * | 9/2006 | Olvera-Hernandez et al. | 455/552.1 |
| 2006/0258371 A1 * | 11/2006 | Krishnamurthi et al. | 455/456.1 |
| 2007/0025287 A1 * | 2/2007 | Goren et al. | 370/328 |
| 2007/0082645 A1 * | 4/2007 | Malomsoky et al. | 455/338 |
| 2007/0110009 A1 * | 5/2007 | Bachmann et al. | 370/338 |
| 2007/0149211 A1 * | 6/2007 | Dunn et al. | 455/456.1 |
| 2009/0149157 A9 * | 6/2009 | Gallagher et al. | 455/414.1 |

* cited by examiner

*Primary Examiner* — Joseph Arevalo
*Assistant Examiner* — Liton Miah
(74) *Attorney, Agent, or Firm* — Parks IP Law LLC; Mickki D. Murray Esq.

(57) ABSTRACT

A method and apparatus is disclosed whereby location based information (LBI) is used to make access and routing decisions within a network. Such LBI is sent from mobile devices to the core network when the mobile device registers with the network and is updated periodically. Over time, this collected LBI data represents the position of mobile devices over time and periodic patterns of usage in different geographic areas. When a network receives an indication that a mobile device requires registration with the network, the network determines as a function of said LBI, a desired network access technology to use to connect said mobile device with the network. Instructions are then transmitted to the mobile device to establish a connection using said desired network access technology and the device is registered with the network. Dynamically updated LBI information from mobile devices is also used for IP network routing optimization.

21 Claims, 5 Drawing Sheets

METHOD AND SYSTEM FOR SELECTING A WIRELESS ACCESS TECHNOLOGY USING LOCATION BASED INFORMATION

BACKGROUND OF THE INVENTION

The present invention is related generally to wireless communication systems and, in particular, to determining network access in such wireless communication systems.

Wireless communication systems have become ubiquitous. As the numbers of users of such systems grow larger, the cost of building networks supporting these systems increases. As a result, wireless network engineering has grown in importance. Network engineering as used herein means the process of designing a network architecture and developing methods of operating a network, including the design of the components used in the network, as well as the methods of interfacing the network with users. One key element of wireless network engineering is access control. Access control in wireless networks involves matching mobile devices and bandwidth requirements with appropriate access technologies and equipment to meet these requirements. Access control engineering has grown more complex with the advent of end-user devices, such as wireless handsets, that are capable of accessing a wireless network via any of multiple well-known access technologies. For example, various devices may be capable of accessing a wireless network via cellular technology, WI-FI (802.11) technology, WI-MAX (802.16) (802.11, 802.16, and other 802.1x series technologies are collectively referred to herein as 802.1x technologies) and other technologies adapted to interface a device with a wireless network, depending on which access technology is available. These technologies are very well known in the art and will not be discussed further herein other than as is necessary for the understanding of the present invention. Since each of these technologies can be used for wireless network access, it is desirable to take such diverse access abilities into account when engineering the design and operational functionality of a network. However, in wireless networks, the mobile nature of an end user while using such a mobile device makes such engineering difficult.

SUMMARY OF THE INVENTION

These difficulties are essentially solved in accordance with the principles of the present invention. In particular, in accordance with the principles of the present invention, location based information (LBI), discussed further herein below, is used to make access and routing decisions within a network. Such LBI is sent from mobile devices to the core network when the mobile device registers with the network. In particular, this LBI information may be transmitted as a part of the registration message from the mobile device to the network. Over time, this collected data represents the position of mobile devices over time and periodic patterns of usage in different geographic areas.

In one illustrative embodiment, a network receives an indication that a mobile device requires registration with the network. This indication or another indication contains at least a first element of location based information (LBI). Then, the network determines, illustratively as a function of said LBI, a desired network access technology to use to connect said mobile device with said network. Instructions are then transmitted to said mobile device to establish a connection using said desired network access technology and the device is registered with the network. The location information and bandwidth required per endpoint is also used to determine expected traffic entering the network at different points, which allows the optimization of network design as well as the routes used by the routers in the network.

These and other advantages of the invention will be apparent to those of ordinary skill in the art by reference to the following detailed description and the accompanying drawings.

DETAILED DESCRIPTION

Figure 1:
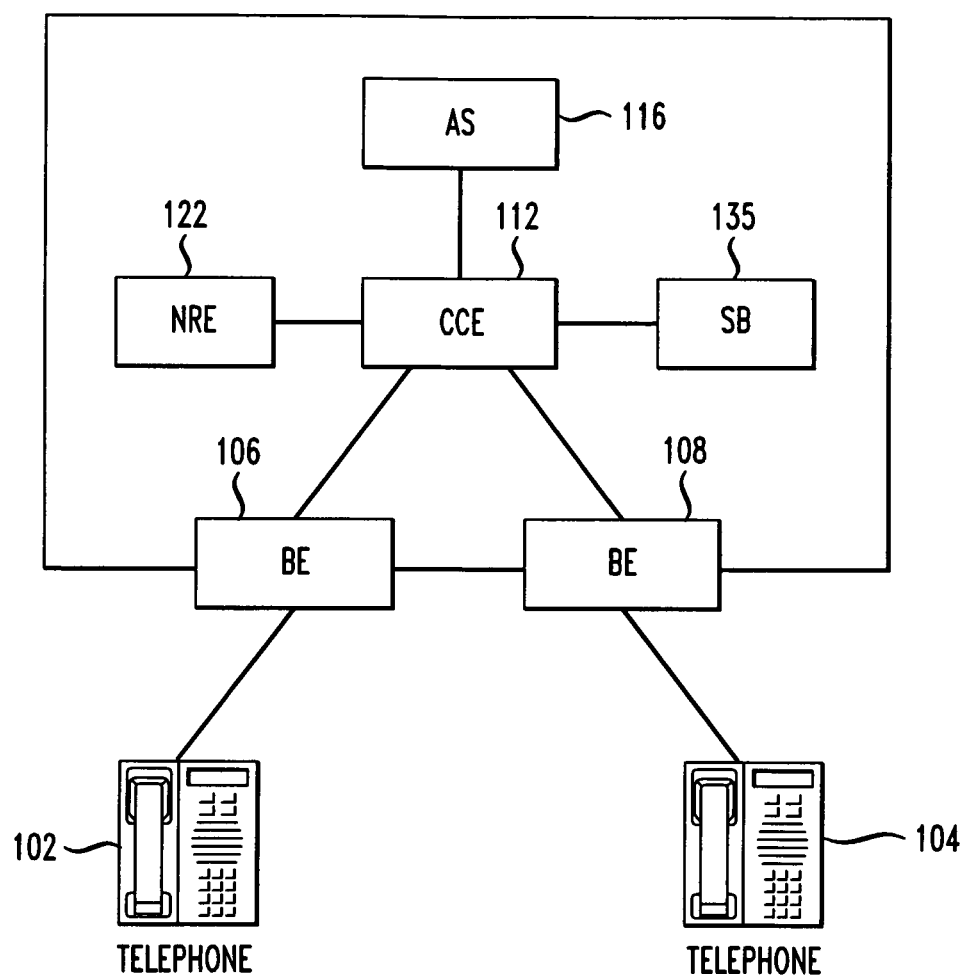
FIG. 1 shows a prior art Internet Protocol telephony network.

Landline telephony networks using a packet-based carrier are well known. FIG. 1 shows a traditional IP network adapted to carry voice calls and data. As is well known in the art, IP is the protocol by which data is sent from one computer to another on data networks, such as the Internet. The network of FIG. 2 utilizes, for example, the Session Initiation Protocol (SIP) in order to set up voice connections (e.g., VoIP calls) between users. SIP is a well known application-layer control protocol used to establish, modify and terminate sessions such as IP telephony calls. The details of SIP are well known to those skilled in the art and will not be described further herein.

With reference to FIG. 1, a traditional SIP network is used to connect callers to one another, here shown as IP enabled telephone 102 and IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, a call is typically initiated by telephone 102 sending a message addressed to telephone 104's Uniform Resource Identifier (URI) which identifies telephone 104. When the message is received at the call control element (CCE) 112, the CCE 112 performs the functions of interfacing with other network elements such as Border Elements (BE) 106 and 108, Service Broker (SB) 135, Application Server (AS) 116, Network Routing Engine (NRE) 122, and other network elements, to provide the necessary functions to process a call request. The functions of the network elements of FIG. 1 are well known and will not be further described other than as is necessary for the understanding of the present invention.

Designing and engineering a network such as that shown in FIG. 1 involves determining the bandwidth requirements in different geographic areas that are associated with access technology that terminates on network gateways, and then assigning network resources to carry traffic from those geographic areas as well as ensuring the centralized network elements are sufficiently robust to provide service to customers. In a landline IP network, such design and engineering tasks were relatively simplistic, since the end users at landline telephones were typically static in location. However, as more and more communications networks rely on packet-based systems, such IP networks have also been considered for wireless applications. Wireless networks have traditionally relied on well-known cellular technologies with geographically dispersed base stations supported by base station controllers, mobile switching centers and other elements in a centralized network that have used specific protocols and network architectures that are primarily designed for efficiently carrying voice traffic. Cellular networks provide broadband access for data traffic that will also be used for VoIP telephony. Network design and engineering is much more complex in such wireless networks primarily because end users are mobile and it is much more difficult to predict the service and bandwidth requirements at any given time. Network engineering efforts in such systems estimated traffic usage when initially designing the network and then revised network design when actual historical bandwidth usage data was available. However, such engineering activities sometimes did not provide adequate network resources for all users. For example, when more mobile users than usual were located in a particular geographic area, sometimes calls were dropped or service was otherwise unavailable.

Figure 2:
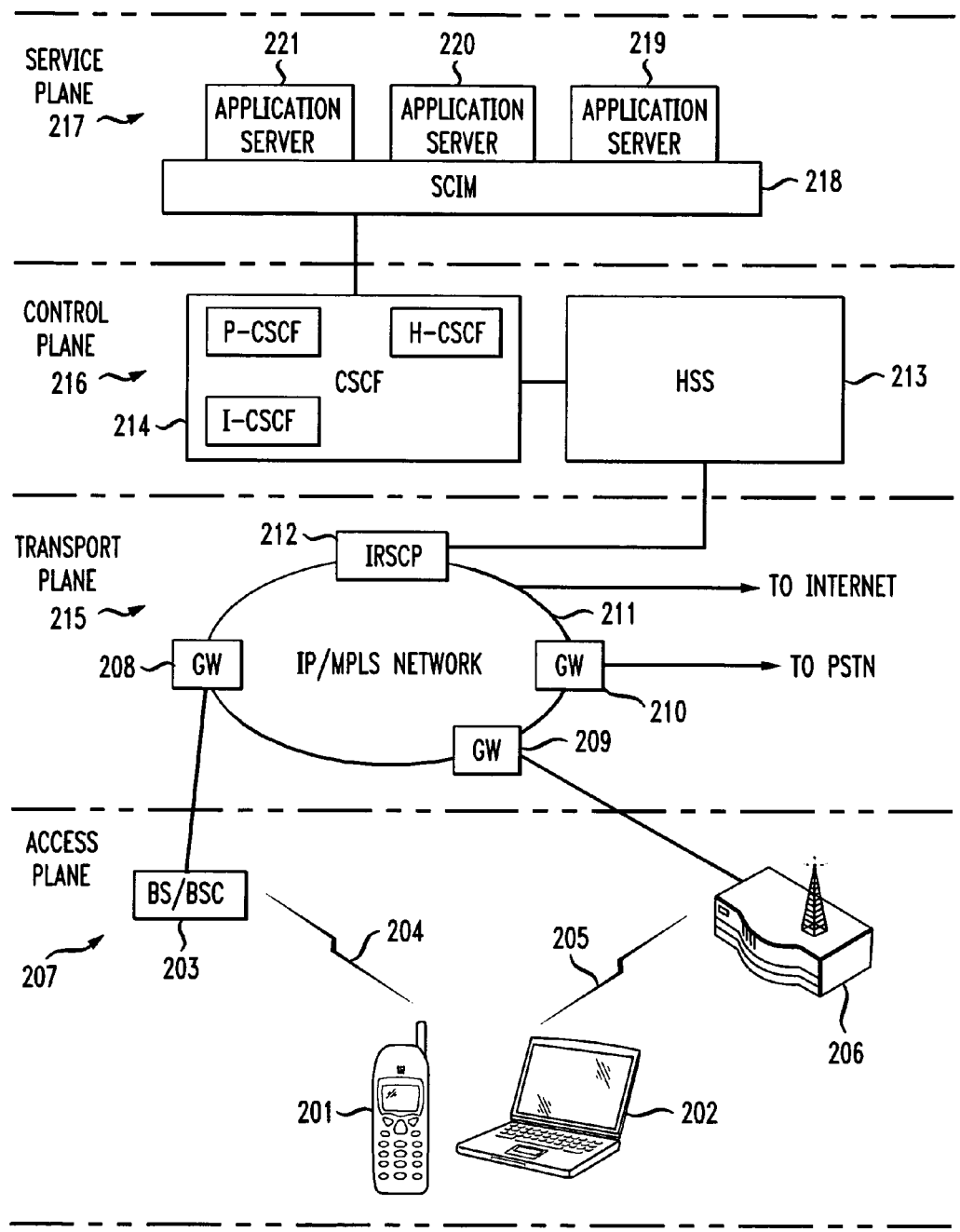
FIG. 2 shows an Internet Protocol (IP) Multimedia System in accordance with one embodiment of the present invention.

As the transition from traditional cellular networks to packet-based networks occurs, it has been recognized as desirable to be able to use a common packet-based network for all types of communication: data, landline telephony, and wireless telephony. Therefore, attempts at converging these types of communication into one network have been made. FIG. 2 shows one such effort, specifically an illustrative communication network that can support multiple access technologies, referred to herein as an IP Multimedia System (IMS) network. The IMS framework is a new network architecture developed by the 3rd Generation Partnership Project (3GPP) wireless standards consortium and is a collection of carrier network functions and processes. The goal of the IMS standards is to standardize an operator-friendly environment for real-time, packet-based calls and services that not only will preserve traditional carrier controls over user signaling and usage-based billing, but also will generate new network functionality.

When a communication is received from, for example, one of devices 201 or 202, it enters network 211 as discussed above. The Call Session Control Function (CSCF) 214 determines whether the endpoint is registered for service. The CSCF refers to Home Subscriber Server (HSS) 213. HSS 213 provides call session establishment criteria, including identification of the end user, and access authorization functions, as well as other services associated with, for example, mobility management, security, and service provisioning. The HSS 213 performs these functions by referring to the CSCF 214. CSCF 214 has, for example, Interrogating, Home and Proxy Call Session Control Function components (referred to herein as I-CSCF, H-CSCF and P-CSCF functions, respectively). In IMS, every user signaling event, feature activation, call session initiation, resource allocation, or requests for any other application or service-first stops at the P-CSCF, which is the user device's first contact point within the IMS core network. The P-CSCF forwards SIP messages received from the end user via the IRSCP to the I-CSCF or the S-CSCF, depending on the type of message and procedure. The I-CSCF provides a contact point within an operator's network allowing subscribers of that network operator, and roaming subscribers, to register. Once registered, the S-CSCF maintains session state for all IMS services. Such services are provided in the service plane 217 via a service capability interaction manager (SCIM) 218 that performs functions similar to a service broker in a cellular network and coordinates the applications provided by application servers 219, 220 and 221.

The network of FIG. 2 also has IP Routing Service Control Point (IRSCP) 212 that, in part, performs a 'meta router' function to determine the optimal IP routing tables for each router in the transport network. The IRSCP 212 uses LBI as part of the criteria for IP routing to determine the traffic that needs to be transmitted among various routers in the network. LBI indicates which mobile devices are in a particular geographic area and, thus, represents potential traffic demand on the network based on the location of those devices. Since LBI information is dynamically transmitted with each registration message, the potential demand for network services is dynamically known to the IRSCP 212. Accordingly, IRSCP 212 can, for example, determine potentially high traffic portions of the network and route traffic to other, less congested, portions of the network to optimize IP routing in the transport network. Accordingly, in addition to the network determining as a function of LBI which access technology is used, the network also determines the gateway (GW) by which that traffic enters the IP/MPLS network.

The IMS of FIG. 2 will not be discussed further herein other than as is necessary for the understanding of the present invention. However, it is relevant to recognize that networks such as the IMS network of FIG. 2 can support multiple access technologies and provide a common transport, control and service plane to calls made across any of those access technologies.

As discussed above, a significant problem in networks such as IMS 200 of FIG. 2 is that engineering the structure and functionality of the network is very complex, especially for the elements of the network that support wireless communications. For example, when services can be provided between a combination of cellular access and wireless LAN access (e.g., 802.11), then a decision has to be made as to the location and capability of each access point (e.g., wireless LAN router, cell phone base station, etc). Then, during operations, an intelligent decision about how to allocate the available resources (e.g., which method of accessing the network) has to be made.

In traditional wireless networks, an end user device (e.g., cellular telephone) or the user of that device made the decision as to which access technology to use to provide communication service. This decision was typically made based on a characteristic of the signal, such as signal strength, between the end user and the access point of the network. For example, in cellular networks, a cellular telephone could automatically use the base station which provided the highest signal strength. When moving, if a higher signal strength was available to the mobile device, a handoff to the new base station would be initiated. Such a device or user-based access selection was possible due to the seamless and regular layout of cellular base stations. Each base station was essentially interchangeable from the perspective of the network and, therefore, if a channel on a base station having a higher signal strength was available, hand-offs did not require any special considerations by the network. However, since the devices did not have detailed information related to the network, such devices sometimes would make undesirable access decisions from a network standpoint. For example, the device might initiate a handoff to a new base station even though that base station was near maximum operating capacity. From a network perspective, it may be desirable to have the device be handed off to another, lower traffic base station even if the signal strength from that base station was not as strong.

In networks such as the network of FIG. 2, the availability of different access technologies adds an additional layer of complexity to such access decisions. In particular, demand for services across wireless LAN routers have to be considered in addition to the cellular access demand. The engineering of the placement of cell towers/base stations and wireless LAN access points, as well as the capacity of the supporting network infrastructure, thus becomes important when designing such a converged network. Current approaches to addressing these access issues typically still relied on the device-based access selection method described above. However, as a result, service providers had to account for periodic wide variations in demand as mobile users moved from one area to another. These approaches tended to result in the underutilization of resources (i.e., the resources assigned to certain areas were too robust) thus increasing the cost of the network unnecessarily, or inadequate resource allocation, thus resulting in poor service and coverage.

The present invention substantially solves the foregoing problems. In particular, in accordance with the principles of the present invention, location based information (LBI) is used to make access and routing decisions within a network, such as the network of FIG. 2. In particular, LBI is collected from network access equipment and from user devices in order to engineer the design of the network and then to provide intelligent access decisions during network operations. As used herein, LBI is defined as information related to the location of a mobile device and/or network element (e.g., wireless LAN router), such as geographic coordinates and is obtained from, for example, the built in Global Positioning System (GPS) receivers in many new mobile devices. One skilled in the art will recognize that such LBI can be obtained from other well-known geolocation techniques, such as triangulation based on signals received from two or more cellular antennas. LBI may also include other information such as velocity and quality of service experienced by an end user at a particular location. One skilled in the art will recognize that LBI has been used in communications networks previously. However, typically, such LBI has only been used to provide location-dependent services to an end user. For example, a network may use this information to provide list of restaurants near the end user. LBI has not been used as a design criteria for networks or to make intelligent access and routing decisions for calls.

Therefore, in accordance with one aspect of the present invention, LBI is sent from mobile devices to the core network when the mobile device registers with the network. In particular, this LBI information is transmitted as a part of the registration message via transport network 211 in FIG. 2 to, for example, the HSS 213 where it is stored. Over time, this collected data represents the position of mobile devices over time and periodic patterns of usage in different geographic areas. In accordance with another aspect of the present invention, the position of wireless LAN access points and cellular base stations is also collected. Such location information can be obtained, for example, by incorporating GPS receivers into those devices similar to the mobile devices. Then, the information can be provided to the core network, once again illustrative HSS 213, by periodically transmitting the location information to the core network from the access points/base stations. Alternatively, one skilled in the art will recognize that such location information can be obtained by having the core network interrogate the access points/base stations to retrieve the information, thus the LBI reflects dynamically the location of the endpoint desiring network access for services. Regardless the method of obtaining the mobile device LBI information and the access point/base station location information, the end result is that a database of location information for mobile devices, wireless access points and base stations is obtained and stored.

Once LBI data is stored for these devices, it is illustratively used for two different purposes, as discussed above. First, LBI is used for engineering purposes in order to ensure that adequate network resources, such as cellular base stations and wireless LAN access points are available to support demand for network access. LBI used for this purpose is referred to herein as LBI-Engineering, or LBI-E. Such network LBI-E information can be used in conjunction with other access requirements (e.g., to support a guaranteed class of service) in order to design the layout of the network as well as the design and robustness of network components such as gateways 208, 210 and 209 or other border elements used to gain access to transport network 211.

LBI information is also used when the mobile device registers with the network to determine the desired network access method to be used by a particular mobile device. Contrary to prior efforts, and according to an advantage of the present invention, the network, not the mobile device or the user of the mobile device, selects the appropriate access method for the mobile device. For example, when a new mobile device, such as mobile phone 201, registers with network 200 via CSCF, the H-CSCF component of the CSCF in conjunction with the LBI information identifies the locations of mobile devices in proximity to the mobile phone 201. This information is used in conjunction with the known capabilities and locations of wireless access points, such as wireless access point 206, and base stations, such as BS/BSC 203, in order to select the most optimal access technology to provide network access to mobile phone 201. By monitoring access patterns over time during a call, the H-CSCF in conjunction with the HSS can determine when a handoff from one access technology to another (e.g., from WiFi to cellular and vice versa) is appropriate. Such dynamic handoffs from one access technology is referred to herein as Dynamic Over the Air Programming (DOTAP).

Figure 3:
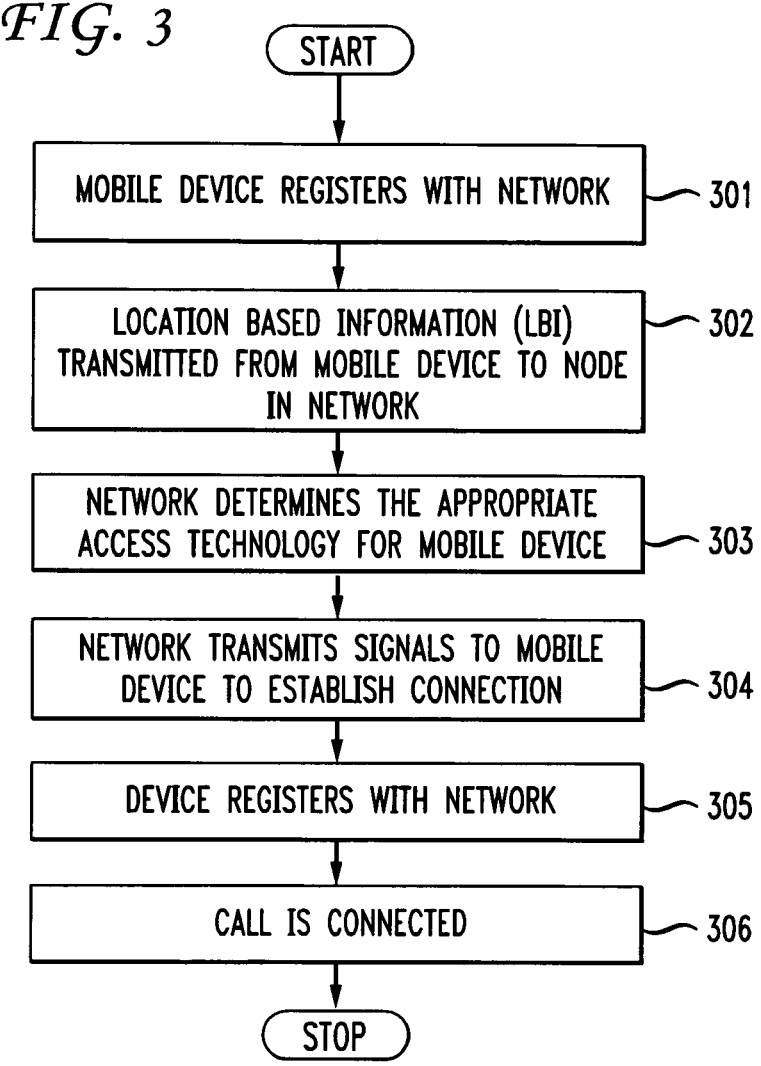
FIG. 3 shows a first method in accordance with one embodiment of the present invention.

FIG. 3 shows a method in accordance with an embodiment of the present invention. Specifically, FIG. 3 shows a method for use when a new mobile device, such as mobile telephone 201 in FIG. 2, has multiple access technologies available to connect to a communications network. At step 301, a mobile device registers with a network, such as with the HSS 213 of network 200 of FIG. 2. Next, at step 302, LBI information indicating the position of the mobile device is transmitted from the mobile device to a node in the network, such as HSS 213. Then, at step 303, the network determines, for example, at a H-CSCF function in the network, which access technology to use for the mobile device. Next, at step 304, the network sends appropriate signals to the mobile device to establish a connection using the desired network access technology, for example, cellular access via BS/BSC 203. Then, at step 305, the device registers with the network using that access technology and, at step 306, the call is routed through the network and the call is connected.

Figure 4:
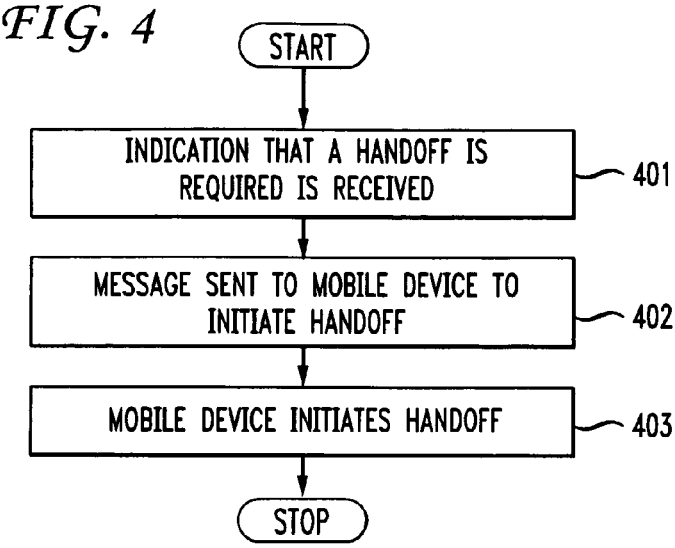
FIG. 4 shows a second method in accordance with one embodiment of the present invention.

FIG. 4 shows another method in accordance with the principles of the present invention whereby dynamic handoffs between different access technologies (e.g., from cellular to 802.1x and vice versa) are made in a network such as network 200 in FIG. 2. At step 401, an indication that a handoff is required is received in the network at, for example, HSS 213 in FIG. 2. This indication may be, for example, an indication that a specific customer or groups of customers require additional resources from a specific access technology, such as cellular access technology, to support a guaranteed class of service. This may require that some mobile devices, such as mobile device 201, be handed off to another access technology, such as from the cellular access technology to 802.1x access via wireless access point 206. Then, at step 402, HSS sends a message to mobile telephone 201 to initiate a handoff from, for example, cellular access via BS/BSC 203 to 802.1x access via wireless access point 206 to wireless access point 201. Finally, at step 403, mobile telephone 201 initiates the handoff.

Figure 5:
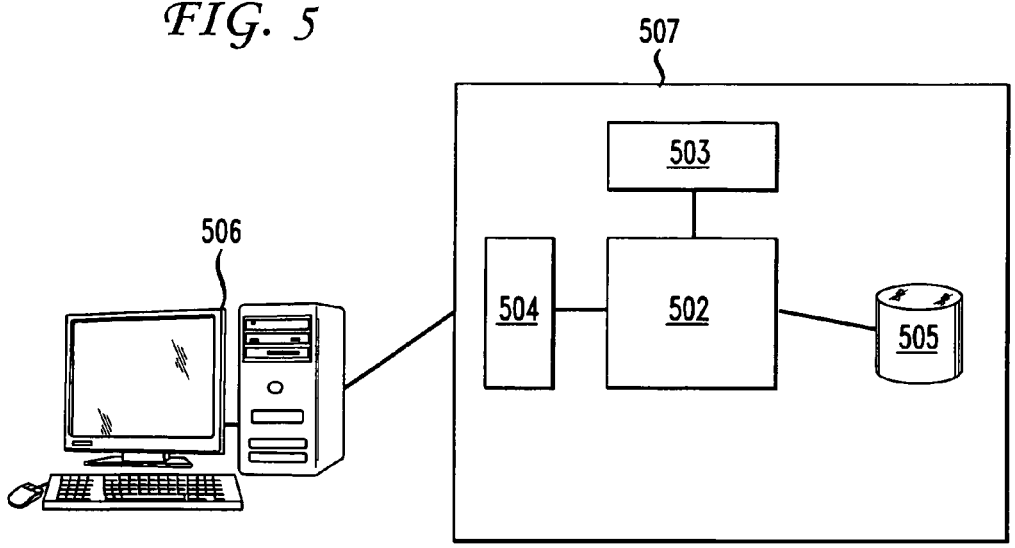
FIG. 5 shows a computer adapted for use in accordance with various embodiments of the present invention.

The steps of the methods discussed above in association with FIG. 3 and FIG. 4 may be performed by a computer adapted to perform the functions described above. FIG. 5 shows a block diagram of one embodiment of a computer that can be used in the network elements of FIG. 2 to perform these functions. Referring to FIG. 5, computer 507 may be implemented on any suitable computer adapted to receive, store, and transmit data such as the aforementioned LBI information. Illustrative computer 507 may have, for example, a processor 502 (or multiple processors) which controls the overall operation of the computer 507. Such operation is defined by computer program instructions stored in a memory 503 and executed by processor 502. The memory 503 may be any type of computer readable medium, including without limitation electronic, magnetic, or optical media. Further, while one memory unit 503 is shown in FIG. 5, it is to be understood that memory unit 503 could comprise multiple memory units, with such memory units comprising any type of memory. Computer 507 also comprises illustrative network interface 504 that is used to interface with other network components. One skilled in the art will recognize that network interface 504 is representative of any number of network interfaces interfacing said network elements to the other elements in said network. Computer 507 also illustratively comprises a storage medium, such as a computer hard disk drive 505 for storing, for example, data and computer programs adapted for use in accordance with the principles of the present invention as described hereinabove. Finally, computer 507 also illustratively comprises one or more input/output devices, represented in FIG. 5 as terminal 506, for allowing interaction with, for example, a service provider technician or database administrator. One skilled in the art will recognize that computer 507 is merely illustrative in nature and that various hardware and software components may be adapted for equally advantageous use in a computer in accordance with the principles of the present invention.

Figure 6:
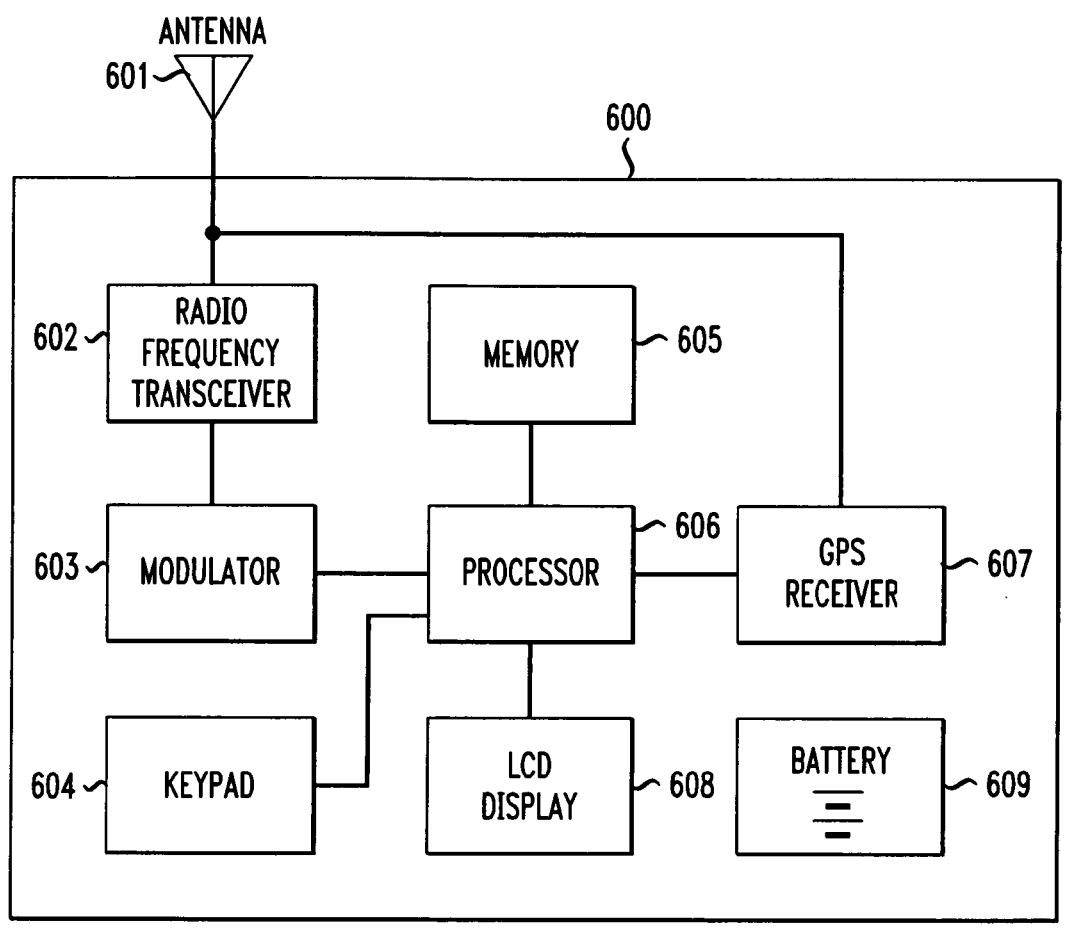
FIG. 6 shows a block diagram of an illustrative mobile device.

FIG. 6 shows a mobile device, illustratively a mobile telephone, in accordance with another embodiment of the present invention. Referring to that figure, mobile telephone 600 has illustrative memory 605 and processor 606 for storing and performing, respectively, the steps of program instructions adapted for use in mobile telephone 600. Mobile telephone 600 also has illustrative keypad 604 for entering data such as telephone numbers into the memory 605. Other components of mobile telephone 600 include battery 609, GPS receiver 607, modulator 603, radio frequency transceiver 602, LCD display 608 and antenna 601.

The operations of a mobile telephone such as mobile telephone 600 are well known in the art. Therefore, such operations will not be described herein other than as is necessary for the understanding the principles of the present invention. In operations, GPS receiver receives positioning data from, for example, GPS satellites in order to compute the aforementioned LBI. Once again, determining such LBI information is well known and will not be described in detail herein. Such LBI can be determined from one of several positioning techniques, including triangulation as discussed previously. According to another embodiment of the present invention, mobile telephone 600 sends a registration message via radio frequency transceiver 602 and antenna 601 in order to register with a wireless network. Illustratively, the registration message illustratively contains LBI. Thus, when the registration message reaches the network, it is used as described herein above to determine a desired network access technology to assign to the mobile device. Then the network sends a message instructing mobile telephone 600 via antenna 601 and radio transceiver 602 to use a particular access technology, e.g., cellular access technology. As a result, the network-determined access technology is used by mobile telephone 600 to initiate calls within the network.

In another embodiment, mobile telephone 600 is instructed to initiate a hand off from one access technology to another access technology. For example, if mobile telephone 600 is connected to a network via cellular access technology, and the network determines as discussed hereinabove that it is desirable that mobile telephone 600 use 802.1x access technology instead, then a message indicating a handoff is required is sent to mobile telephone 600 where it is received via antenna 601 and radio transceiver 602. Processor 606 then initiates the hand off according to well known procedures for handoffs.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving, by a computer comprising a processor, location-based information associated with a mobile device;
   identifying, by the computer, a first wireless access point, comprising a wireless local area network router having a first coverage area encompassing the mobile device, and a first gateway element associated with the first wireless access point, yielding a first access point/gateway pair;
   identifying, by the computer, a second wireless access point, comprising a cellular base station having a second coverage area encompassing the mobile device, and a second gateway element associated with the second wireless access point, yielding a second access point/ gateway pair;
   determining, by the computer, using the location-based information, which one of the first wireless access point and the second wireless access point to use to connect the mobile device to a communication network, including determining which one of the first access point/ gateway pair and the second access point/gateway pair to use to connect the mobile device to the communication network, yielding a determined network access point; and
   transmitting, by the computer, to the mobile device, an instruction indicating the determined network access point for the mobile device to use to connect to the communication network.

2. The method of claim 1, wherein the determining is based on a number of mobile devices positioned in a region including the first wireless access point and the second wireless access point.

3. The method of claim 1, wherein:
   identifying the first wireless access point includes obtaining, from a database, first location data corresponding to the first wireless access point;

identifying the second wireless access point includes obtaining, from the database, second location data corresponding to the second wireless access point from a database; and the determining is based on the first location data and the second location data.

4. The method of claim 1, wherein:

identifying the first wireless access point includes obtaining, from a database, first capability data corresponding to the first wireless access point;

identifying the second wireless access point includes obtaining, from the database, second capability data corresponding the second wireless access point; and the determining is based on the first capability data and the second capability data.

5. The method of claim 1, wherein the communication network is an internet protocol-based network.

6. The method of claim 1, wherein the first wireless access point uses an 802.1x protocol.

7. The method of claim 1, further comprising determining, during a communication involving the mobile device using the determined network access point, that a handoff from the determined network access point to an other of the first wireless access point and the second wireless access point is appropriate.

8. A system comprising:

a processor; and a computer-readable medium having stored therein computer-executable code which, when executed by the processor, causes the processor to perform operations comprising:

receiving location-based information associated with a mobile device;

identifying a first wireless access point, comprising a wireless local area network router having a first coverage area encompassing the mobile device, and a first gateway element associated with the first wireless access point, yielding a first access point/gateway pair;

identifying a second wireless access point, comprising a cellular base station having a second coverage area encompassing the mobile device, and a second gateway element associated with the second wireless access point, yielding a second access point/gateway pair;

determining, using the location-based information, which one of the first wireless access point and the second wireless access point to use to connect the mobile device to a communication network, including determining which one of the first access point/gateway pair and the second access point/gateway pair to use to connect the mobile device to the communication network, yielding a determined network access point; and transmitting, to the mobile device, an instruction indicating the determined network access point for the mobile device to use to connect to the communication network.

9. The system of claim 8, wherein the operation of determining is based on a number of mobile devices positioned in a region including the first wireless access point and the second wireless access point.

10. The system of claim 8, wherein:

the operations further comprise:

identifying the first wireless access point includes obtaining, from a database, first location data corresponding to the first wireless access point; and identifying the second wireless access point includes obtaining, from the database, second location data corresponding to the second wireless access point from a database; and the operation of determining is based on the first location data and the second location data.

11. The system of claim 8, wherein:

the operations further comprise:

identifying the first wireless access point includes obtaining, from a database, first capability data corresponding to the first wireless access point; and identifying the second wireless access point includes obtaining, from the database, second capability data corresponding the second wireless access point; and the operation of determining is based on the first capability data and the second capability data.

12. The system of claim 8, wherein the communication network is an internet protocol-based network.

13. The system of claim 8, wherein the first wireless access point uses an 802.1x protocol.

14. The system of claim 8, wherein the operations further comprise determining, during a communication involving the mobile device using the determined network access point, that a handoff from the determined network access point to an other of the first wireless access point and the second wireless access point is appropriate.

15. A tangible computer-readable storage device comprising computer-executable code that, when executed by a processor, causes the processor to perform operations comprising:

receiving location-based information associated with a mobile device;

identifying a first wireless access point, comprising a wireless local area network router having a first coverage area encompassing the mobile device, and a first gateway element associated with the first wireless access point, yielding a first access point/gateway pair;

identifying a second wireless access point, comprising a cellular base station having a second coverage area encompassing the mobile device, and a second gateway element associated with the second wireless access point, yielding a second access point/gateway pair;

determining, using the location-based information, which one of the first wireless access point and the second wireless access point to use to connect the mobile device to a communication network, including determining which one of the first access point/gateway pair and the second access point/gateway pair to use to connect the mobile device to the communication network, yielding a determined network access point; and transmitting, to the mobile device, an instruction indicating the determined network access point for the mobile device to use to connect to the communication network.

16. The tangible computer-readable storage device of claim 15, wherein the operation of determining includes determining the determined network access point as a function of a number of mobile devices positioned in a region including the first wireless access point and the second wireless access point.

17. The tangible computer-readable storage device of claim 15, wherein:

the operation of identifying the first wireless access point includes obtaining, from a database, first location data corresponding to the first wireless access point;

the operation of identifying the second wireless access point includes obtaining, from the database, second location data corresponding to the second wireless access point from a database; and the operation of determining is based on the first location data and the second location data.

18. The tangible computer-readable storage device of claim 15, wherein:

the operation of identifying the first wireless access point includes obtaining, from a database, first capability data corresponding to the first wireless access point;

the operation of identifying the second wireless access point includes obtaining, from the database, second capability data corresponding the second wireless access point; and the operation of determining is based on the first capability data and the second capability data.

19. The tangible computer-readable storage device of claim 15, wherein the communication network is an internet protocol-based network.

20. The tangible computer-readable storage device of claim 15, wherein the first wireless access point uses an 802.1x protocol.

21. The tangible computer-readable storage device of claim 15, wherein the operations further comprise determining, during a communication involving the mobile device using the determined network access point, that a handoff from the determined network access point to an other of the first wireless access point and the second wireless access point is appropriate.

* * * * *